W. T. BESSONETTE.
3 Sheets—Sheet 1.
COTTON PRESS.
No. 11,422.
Reissued June 19, 1894.
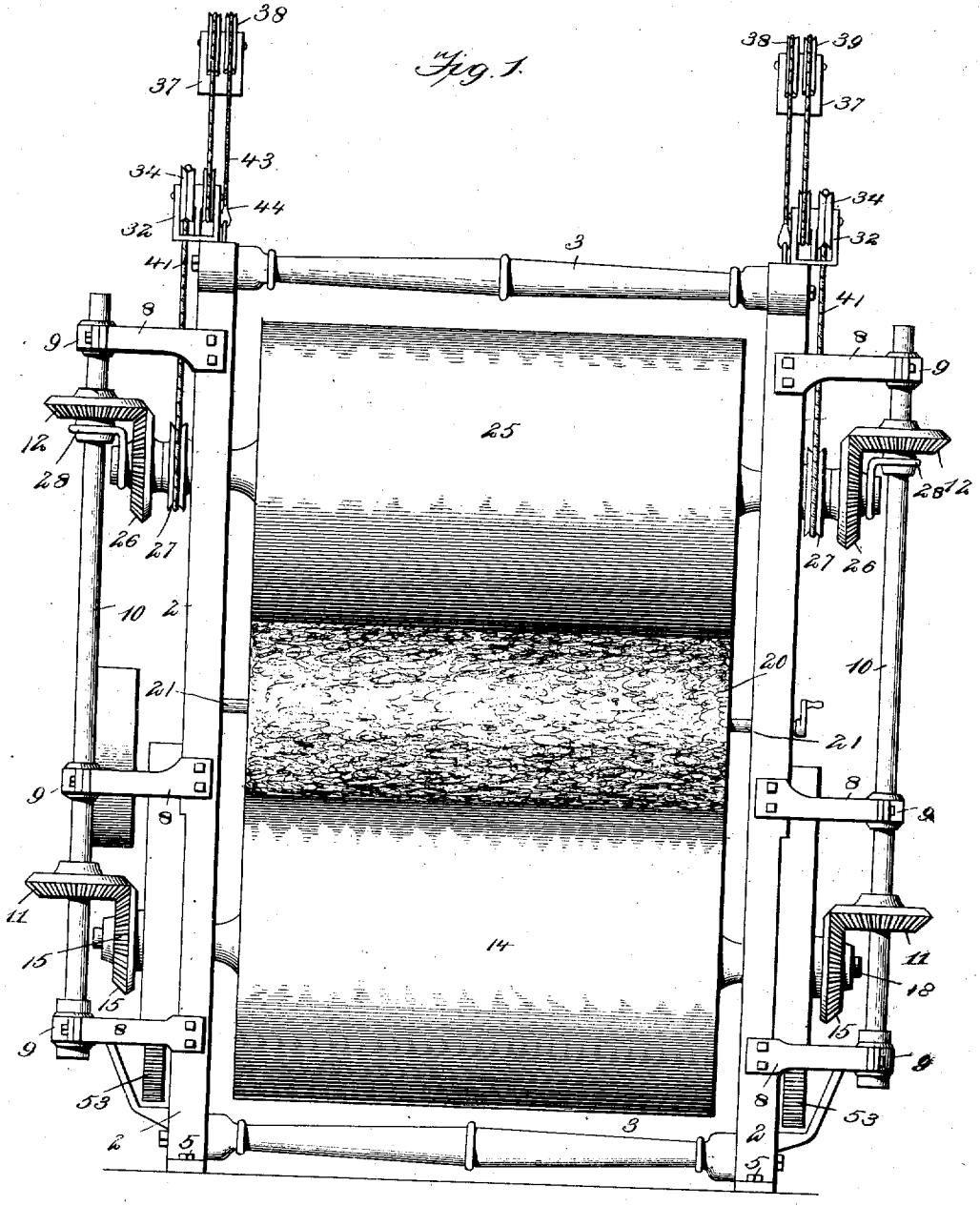
Witnesses
Jas. W. Shaw.
C. E. Doyle
Inventor
William T. Bessonette,
By his Attorneys.
C. A. Snow & Co.
THE NORRIS PETERS CO., PHOTO-LITHO., WASHINGTON, D. C.

W. T. BESSONETTE. 3 Sheets—Sheet 2.
COTTON PRESS.
No. 11,422. Reissued June 19, 1894.
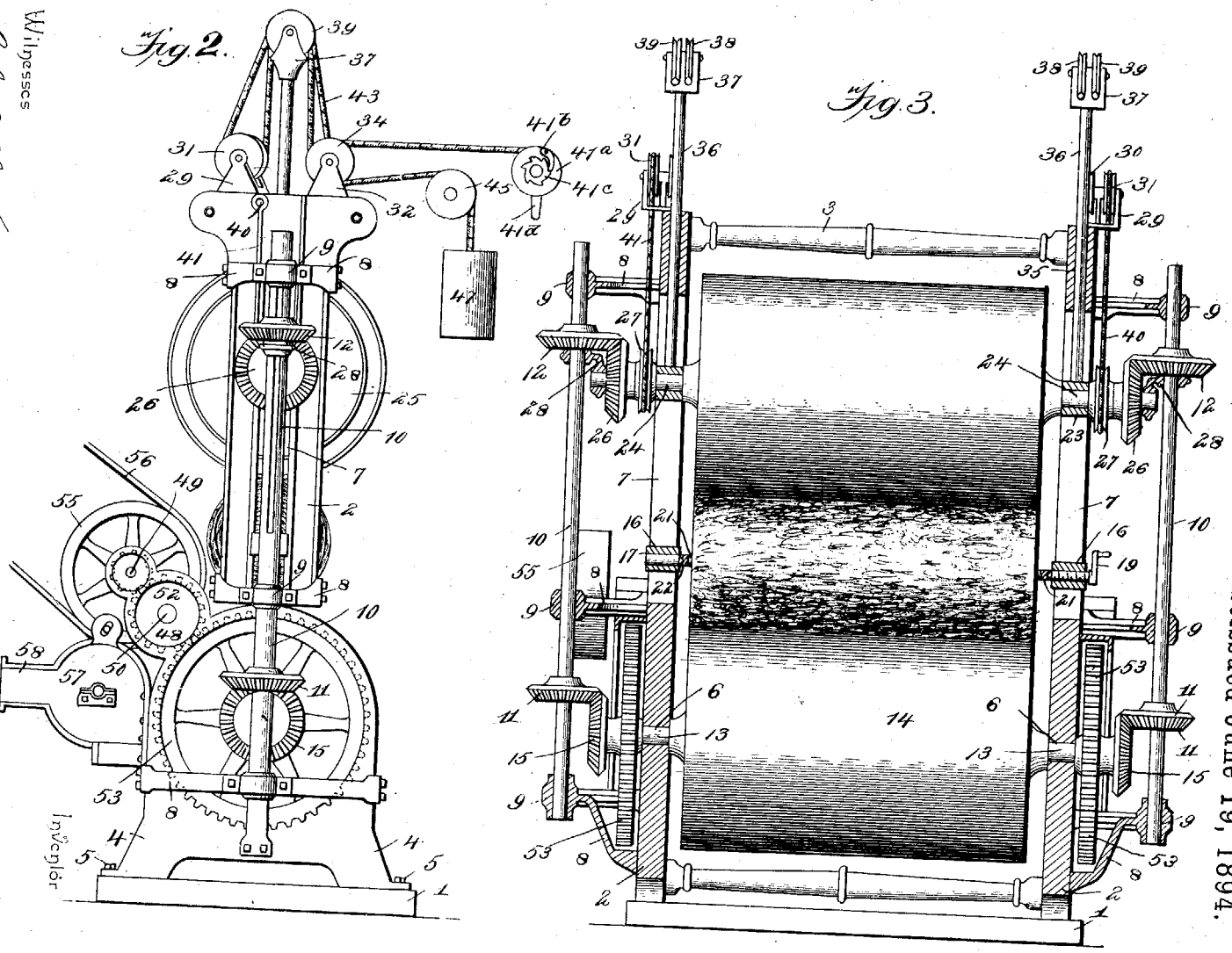
Witnesses
John C. Shaw.
O. E. Doyle
Inventor
By his Attorneys. William T. Bessonette,
C. A. Snow & Co.
THE NORRIS PETERS CO., PHOTO-LITHO., WASHINGTON, D. C.

3 Sheets—Sheet 3.
W. T. BESSONETTE.
COTTON PRESS.
No. 11,422. Reissued June 19, 1894.
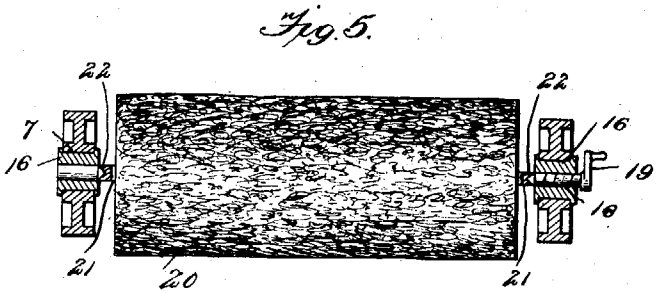
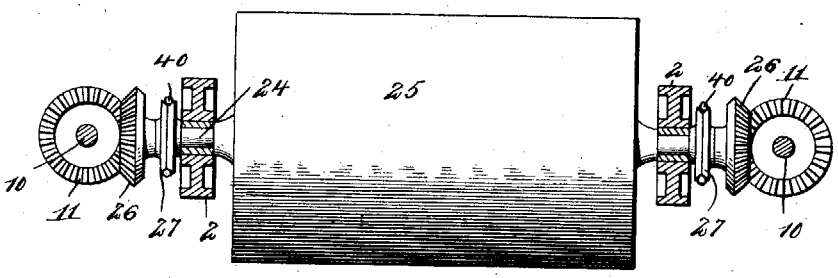
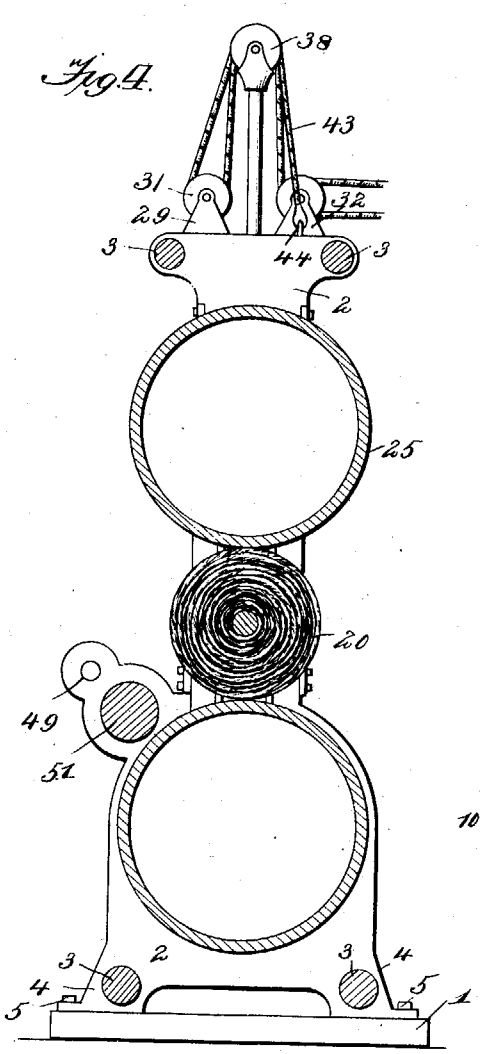
Witnesses
John C. Shaw.
C. E. Foote
Inventor
William T. Bessonette,
By his Attorneys.
C. A. Snow & Co.
THE NORRIS PETERS CO., PHOTO-LITHO., WASHINGTON, D. C.

UNITED STATES PATENT OFFICE.

WILLIAM T. BESSONETTE, OF TEMPLE, ASSIGNOR, BY DIRECT AND MESNE ASSIGNMENTS, TO THE BESSONETTE COTTON COMPRESS MANUFACTURING COMPANY, OF WACO, TEXAS.

COTTON-PRESS.

SPECIFICATION forming part of Reissued Letters Patent No. 11,422, dated June 19, 1894.

Original No. 508,909, dated November 21, 1893. Application for reissue filed April 19, 1894. Serial No. 508,234.

*To all whom it may concern:*

Be it known that I, WILLIAM T. BESSONETTE, a citizen of the United States, residing at Temple, in the county of Bell and State of Texas, have invented a new and useful Improvement in Cotton-Presses, of which the following is a specification.

My invention relates to improvements in cotton-presses, the objects in view being to provide a machine of cheap and simple construction adapted to compress cotton at the initial point of ginning and in a continuous operation with that of ginning, whereby I avoid the expense and labor occasioned by the handling of the cotton during its storage and transportation to the neighboring compress and also the expense of said compression, and at the same time produce such compression or condensation of the cotton that I am enabled to secure the cheap rates of transportation accorded cotton which has been compressed to the standard degree of density.

The invention has particular reference to that class of presses or compresses in which the cotton is formed in a bat and fed to the press, the latter producing a roll which is continuously compressed during the building up or production of the roll.

With these and various other objects in view the invention consists in certain features of construction hereinafter specified and particularly pointed out in the claims.

Referring to the drawings:—Figure 1 is a front elevation of a machine constructed in accordance with my invention. Fig. 2 is a side elevation thereof. Fig. 3 is a vertical longitudinal section. Fig. 4 is a transverse vertical section. Fig. 5 is a transverse horizontal section through the sliding-box of the core-roll. Fig. 6 is a similar view through the sliding box of the compressing roll.

Like numerals of reference indicate like parts in all the figures of the drawings.

Upon a suitable base or bed-plate 1 there is supported a pair of opposite vertical sides or standards 2, which sides or standards are preferably constructed of cast-iron, and at top and bottom are connected by means of transverse tie-rods 3, the bottoms of said sides or standards terminating in suitable securing-flanges or feet 4, through which bolts 5 are passed into the sill or bed-plate. The sides or flanges are provided near their lower ends with stationary journal-boxes 6, and above the same with vertical slots or openings 7, which extend from points above the boxes to points near the upper ends of the standards. From each of the vertical sides or standards 1 there extends a series of horizontally and outwardly disposed bearing-arms or brackets 8, the same having bearings 9 in their outer ends, each series accommodating a vertical shaft 10, each shaft having mounted thereon near its lower end a beveled pinion 11, and having splined thereon above said pinion a second or upper movable pinion 12.

In the journal-box 6 there is journaled the shaft 13, which carries the lower or bed-roll 14. The ends of the shaft 13 project through the boxes 6 and have affixed thereto beveled pinions 15 which engage with the beveled pinions 11 of the vertical shafts 10.

In the slots 7 of the standards flanged bearing-boxes 16 are mounted for vertical movement, one of said bearing-boxes being provided with a conical bearing-pin 17, and the other with a conical bearing-screw 18, which is designed to be operated through the medium of a small hand-crank 19, with which the outer end of said screw is provided.

20 designates the core-roll, the same preferably having its surface covered with small spurs or teeth designed to engage the fiber of the cotton, and having a shaft agreeing in width with the distance between the standards 1. The shaft 21 of the roller 20 is provided with concaved ends 22, which are designed to engage the conical bearing-points of the pin 17 and screw 18.

Above the sliding boxes 16 there is mounted in the slot 7 of the standards an upper pair of sliding-boxes 23 and in them is journaled the shaft 24 of the compression-roll 25. The ends of the shaft 24 project beyond the boxes 23, and each end is provided near its extremity with a beveled pinion 26, and in rear of the same with a pulley 27. L-shaped brackets 28, having bearing-eyes, fit over the ends of the shaft 24 and receive the hubs upon the under sides of the pinions 12, which pinions 12 engage with the pinions 26 just mentioned, and in the sliding movements of the boxes 23 the pinions 12 follow so that they always engage with said pinions 26.

Upon each of the standards near the rear ends thereof there is located a pair of bearing-ears 29, and in each there is loosely journaled an inner grooved-pulley 30 and an outer grooved pulley 31. Upon the standards and in front of the bearing-ears 29 a second pair of bearing-ears 32 is located, in which is located an inner pulley 33 and an outer pulley 34. Between these bearing-ears 29 and 32 an opening 35 is formed in the upper end of each standard, and in each opening there is located a vertically movable rod 36, whose lower end rests upon the bearing-boxes 23, and whose upper ends are provided with bearing-ears 37 in which an inner pulley 38 and an outer pulley 39 are journaled.

To stationary studs 40 extending from the upper ends and outer sides of the standards 1 depend ropes or cables 41, the free ends of these ropes or cables passing down under and partially around the pulleys 27, thence up and over the outer pulleys 31 and to the rear.

A drum 41[a], as shown in Fig. 2, is provided at any suitable point and mounted upon any preferred form of support or standard, not shown, the ends of the ropes or cables 41 being attached thereto, and said drum being provided with suitable means, such as a pawl 41[b] engaging a ratchet 41[c] for preventing backward rotation of the drum. Any suitable means for rotating the drum, such as a handle 41[d], may be provided. Through the medium of this drum it will be seen that the ropes or cables 41 being wound thereon will serve to elevate or lower the boxes 23, the compressing-roll 25, and the pinions 26 and 12.

Small ropes 43 have one of their ends connected fixedly at 44 to eyes upon the upper ends of the standards 2, thence pass up and over the inner pulleys 38 of the rod, down and under the pulleys 33, up and over the outer pulleys 39 of the rod, thence down and under the inner pulley 30, and off over suitable guide-pulleys 45 where they are provided with pendent weights 47, which as will be obvious, will exert pressure upon the upper ends of the rods 36, and hence upon the bearing-boxes of the compressing-shaft 24.

The standards are provided at their rear sides with bearings 48 and 49, in the former of which there is mounted a shaft 50 carrying a guide-roll 51 and a gear 52, the latter engaging a large gear-wheel 53 which is located upon the shaft 13 of the bed-roll 14. In the bearing-boxes 49 a shaft 54 is mounted, the same carrying a pulley 55 driven by a belt 56 leading from any suitable motor.

Below the shaft 50 there is located a condenser 57 of ordinary construction whose flue 58 is intended to lead from the discharge end of a gin of any ordinary construction.

The cotton passing in a soft mass from the gin is, as usual, converted into a soft bat which is fed in a continuous web from the condenser under the guide-roll 51 to the core-roll 20, the speed of the condenser being the same as that of the machine. As the cotton is wound upon the roll it will be seen that it will be compressed into a thin sheet by the condensing-roll 25 and the lower bed-roll 14. The compression is continuous as the size of the roll increases and as the cotton accumulates upon the core-roll the journals of the latter, as do also those of the condenser-roll, move vertically together with their boxes in the slots of the standards 2. When the bale has been completed and it is desired to remove the same, the winding-drum is operated so as to elevate the condensing-roll from the core-roll and the bearing-screw 18 being loosened the said core-roll is removed, a new one substituted, the condensing-roll relowered, and the machine again started.

A machine of this character can be constructed at a very slight cost and is within the reach financially of nearly every cotton producer. By such means he is enabled to condense ready for shipment with all the advantages of rates to any desired market, and effect a saving in the handling of the cotton, which is occasioned by the necessity which usually exists of storing the same upon the plantation, hauling it to the point of compression, and finally, in the condensing itself, all of which is necessary to reduce the mass or bale to the standard density required by the transportation companies in order to give the shipper the advantageous rates.

Various changes in the details of my invention will suggest themselves to those skilled in this class of inventions, and though I have herein shown a simple and convenient mechanism for practicing my invention, yet I do not wish to be understood as limiting the same to such precise details, but hold that I may vary them to any extent within the knowledge of the skilled mechanic.

Having described my invention, what I claim is—

1. In a cotton-press, the combination with the opposite side frames, the upper and lower rolls, movable journal-boxes for the upper roll, and means for giving motion to said rolls, of an intermediate core-roll, means for exerting pressure upon the upper roll, and means for raising said upper roll above and out of contact with the core roll, substantially as specified.

2. In a cotton press of the class described, the combination with the opposite side-frames, the upper and lower rolls, movable bearing-boxes for the upper roll, pulleys arranged on the ends of the shaft of said roll, and means for giving motion to said rolls, of an intermediate core-roll, means for securing the same removably in position, pulleys on the upper ends of the frames, cables secured at one of their ends to the frame above the upper roll, and passed under the pulleys, on the shaft, and up over the pulley of the frame outwardly to a winding-drum, and means for operating said drum, substantially as specified.

3. In a cotton press of the class described, the combination with the opposite frames, an upper and a lower roll journaled therein, the upper roll being movable vertically, of an intermediate core-roll, rods arranged in openings on the frame and having their lower ends supported upon the bearings of said upper roll, pulleys located in the upper ends of the rods, cables connected to the frames and passed over the pulleys, weights connected to the ends of the cables, for exerting pressure on the upper roll, and means for giving motion to the rolls, substantially as specified.

4. In a cotton press of the class described, the combination with the opposite frames, an upper and a lower roll journaled therein, the upper roll being movable vertically in said frames, of an intermediate core roll, rods arranged in openings in the frame and having their lower ends supported upon the bearings of the said upper roll, pulleys mounted in the upper ends of the rods and pulleys also mounted in the said frames, cables passing over said pulleys on the rods with weights at the ends thereof to bear down on said rods, and cables passing over said pulleys on the frame and passing under the bearings of said upper roll, and a drum and means for revolving the same for winding up said latter cables and so raising said upper roll clear of the core roll, substantially as described.

5. In a cotton press of the class described, the combination with the opposite side frames, the upper and lower rolls journaled therein, vertically movable boxes for the upper roll, vertically movable boxes arranged between the rolls, bearing pins arranged in said latter boxes, means for adjusting one of the pins, a core roll having its shaft journaled upon the pins, and means for giving motion to said rolls, of rods arranged in the upper ends of the frames and bearing upon the bearings of the upper roll, pulleys arranged in the upper ends of the rods and in front and in rear thereof, and guide pulleys arranged adjacent to the press, cables connected to the machine and having their free ends passed over the inner pulleys of the rods down over one of the pulleys of the frame, again over the outer pulleys of the rods, and down under the remaining pulleys of the frame, thence over the guide-pulleys, and weights depending from the guide-pulleys, substantially as specified.

6. In a cotton press of the class described, the combination with the opposite side frames, the upper and lower rolls journaled therein, vertically movable boxes for the upper roll, vertically movable boxes arranged between the rolls, bearing-pins arranged in said latter boxes, means for adjusting one of the pins, a core-roll having its shaft journaled upon the pins, and means for giving motion to said rolls, of rods arranged in the upper ends of the frames and bearing upon the bearings of the upper roll, pulleys on the rods and on the frames, and cables passing over said pulleys, with weights on the ends of said cables for pressing said rods downward and so exerting a pressure on said core roll, substantially as described.

7. In a cotton press of the class described, the combination with the opposite side frames having vertical slots, boxes below the said slots, the shaft 13 arranged in the journal-boxes, the pinions 15 thereon, the movable journal boxes 16 and 23 arranged in the slots, the core-roll 20 having a shaft 21 journaled in the boxes 16, the shaft 24 carrying the roll 25 journaled in the boxes 23, the beveled pinions 26 arranged on the shaft 24, of the bearing arms 8 projecting from the frame, the vertical shafts 10 arranged therein, the pinions 11 on the lower ends of the shaft meshing with the pinions 15, the L-shaped brackets 28, the pinions 12 splined on the shafts 10 and having their hubs connected with the brackets, and means for raising and lowering the compression roll out of and into contact with the core roll, substantially as specified.

8. In a cotton press of the class described, the combination with the opposite frames having vertical slots, boxes below the said slots, the shaft 13 arranged in the journal boxes, the pinions 15 thereon, the movable journal boxes 16 and 23 arranged in the slots, the core-roll 20 having a shaft 21 journaled in the boxes 16, the shaft 24, carrying the roll 25, journaled in the boxes 23 the beveled pinions 26 arranged on the shaft 24, of the bearing arms 8 projecting from the frame, the vertical shafts 10 arranged therein, the pinions 11 on the lower ends of the shaft meshing with the pinions 15, the L-shaped brackets 28, the pinions 12 splined on the shafts 10 and having their hubs connected with the brackets, means for detaching said core roll from its bearings, and means for raising and lowering the compression roll out of and into contact with the core roll, substantially as specified.

In testimony that I claim the foregoing as my own I have hereto affixed my signature in the presence of two witnesses.

WILLIAM T. BESSONETTE.

Witnesses:
DANL. WISE,
GEO. H. WIEBUSCH.